US012600201B2

(12) United States Patent
Enokizono et al.

(10) Patent No.: US 12,600,201 B2
(45) Date of Patent: Apr. 14, 2026

(54) WIND DIRECTION ADJUSTMENT APPARATUS

(71) Applicant: NIHON PLAST CO., LTD., Fujinomiya (JP)

(72) Inventors: Takashi Enokizono, Shizuoka (JP); Kenichi Kamio, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 595 days.

(21) Appl. No.: 17/985,181

(22) Filed: Nov. 11, 2022

(65) Prior Publication Data

US 2023/0150342 A1     May 18, 2023

(30) Foreign Application Priority Data

Nov. 18, 2021     (JP) ................................. 2021-187993

(51) Int. Cl.
B60H 1/34 (2006.01)
(52) U.S. Cl.
CPC .................................. B60H 1/3414 (2013.01)
(58) Field of Classification Search
CPC . B60H 1/3414; B60H 1/3435; B60H 1/00871

USPC ......................................................... 454/155
See application file for complete search history.

(56) References Cited

U.S. PATENT DOCUMENTS

| 2019/0061476 A1* | 2/2019 | Isobe .................... | B60H 1/3421 |
| 2021/0023913 A1* | 1/2021 | Heth ...................... | B60H 1/3428 |
| 2022/0274464 A1* | 9/2022 | Groben ................ | B60H 1/3421 |

FOREIGN PATENT DOCUMENTS

JP          2013-086659          5/2013

* cited by examiner

*Primary Examiner* — Steven B McAllister
*Assistant Examiner* — Charles R Brawner
(74) *Attorney, Agent, or Firm* — Amin, Turocy & Watson, LLP

(57) ABSTRACT

Provided is a wind direction adjustment apparatus capable of adjusting a wind direction with a simple configuration while improving an appearance. A wind direction adjustment apparatus 1 includes a cylindrical case body 3 whose one end side is contracted in a predetermined direction, and through which air passes from the other end side to the one end side. The wind direction adjustment apparatus 1 includes a cylindrical wind direction adjustment body 26 disposed to be movable in at least the predetermined direction inside the one end side of the case body 3.

10 Claims, 7 Drawing Sheets

WIND DIRECTION ADJUSTMENT APPARATUS

CROSS REFERENCE TO RELATED APPLICATIONS

The disclosure of Japanese Patent Application No. 2021-187993 filed on Nov. 18, 2021 including the specification, drawings and abstract is incorporated herein by reference in its entirety.

TECHNICAL FIELD

The present invention relates to a wind direction adjustment apparatus that adjusts a wind direction.

BACKGROUND ART

Conventionally, in an air conditioner used in a vehicle such as an automobile, a wind direction adjustment apparatus that adjusts a blowing wind direction is known. The wind direction adjustment apparatus is also called an air-conditioned wind blowing apparatus, an air outlet, a ventilator, or a register. For example, the wind direction adjustment apparatus is installed in various parts of the vehicle, such as an instrument panel and a center console part, and contributes to improvement in comfort performance achieved by cooling and heating.

Usually, the wind direction adjustment apparatus is configured as follows. A plurality of fins are set to be pivotable in the vicinity of an air outlet, and a wind direction is changed by pivoting of the fins. In this case, depending on the number of the fins, an opening dimension of the air outlet has to be increased, and in addition, the fins are visible from a user side. Consequently, there are restrictions on designing the wind direction adjustment apparatus and surroundings thereof.

Therefore, there has been proposed a wind direction adjustment apparatus that can adjust the wind direction without using the fins in the vicinity of the air outlet. For example, a technique is known as follows. A main body portion is internally divided into a plurality of flow paths. A ventilation blocking member is disposed in each of the divided flow paths, and the wind direction is adjusted in such a manner that the flow paths are switched to be opened and closed by the ventilation blocking member. (for example, refer to PTL 1).

CITATION LIST

Patent Literature

PTL 1
    Japanese Patent Application Laid-Open No. 2013-86659 (pages 5 to 8, FIGS. 1 to 11)

SUMMARY OF INVENTION

Technical Problem

In a case of the above-described wind direction adjustment apparatus, it is necessary to interlock a plurality of the ventilation blocking members with each other to adjust the wind direction. Therefore, when the ventilation blocking members are mechanically interlocked with each other, a complicated mechanism for the interlocking is required. In addition, it is not easy to intuitively adjust the wind direction, compared to a case of adjusting the wind direction by pivoting of the fins.

The present invention is made in view of the above-described circumstances, and an object of the present invention is to provide a wind direction adjustment apparatus that can adjust a wind direction with a simple configuration while improving an appearance.

Solution to Problem

There is provided a wind direction adjustment apparatus according to claim 1. The wind direction adjustment apparatus includes a cylindrical case body whose one end side is contracted in a predetermined direction, and through which air passes from the other end side to the one end side, and a cylindrical wind direction adjustment body disposed to be movable in at least the predetermined direction inside one end side of the case body.

There is provided the wind direction adjustment apparatus according to claim 2. In the wind direction adjustment apparatus according to claim 1, the one end side of the wind direction adjustment body is contracted in at least the same direction as the one end side of the case body.

There is provided the wind direction adjustment apparatus according to claim 3. In the wind direction adjustment apparatus according to claim 1 or 2, a fin disposed to be pivotable in a direction intersecting with a ventilation direction inside the case body and a movement direction of the wind direction adjustment body is provided on an upstream side in the ventilation direction with respect to the wind direction adjustment body.

There is provided the wind direction adjustment apparatus according to claim 4. The wind direction adjustment apparatus according to any one claims 1 to 3 further includes an operation section disposed to be movable to an outside of the case body. The wind direction adjustment body is disposed to be movable along the movement direction of the operation section.

Advantageous Effects of Invention

According to the wind direction adjustment apparatus of claim 1, the wind direction can be adjusted by changing a ratio of a ventilation amount passing between the wind direction adjustment body and the case body and blowing from one end side of the case body in a direction along contraction of the case body, in accordance with a movement direction and a movement amount of the wind direction adjustment body inside the case body. Therefore, the wind direction can be adjusted by moving the cylindrical wind direction adjustment body with a simple configuration while improving an appearance.

According to the wind direction adjustment apparatus of claim 2, in addition to an advantageous effect of the wind direction adjustment apparatus of claim 1, while a flow velocity of air-conditioned wind passing through the inside of the wind direction adjustment body and straightly blowing from one end side of the wind direction adjustment body can be increased, directionality of the air-conditioned wind blowing from one end side between the wind direction adjustment body and the case body in the direction along the contraction can be improved. Therefore, a wind direction adjustment function can be improved.

According to the wind direction adjustment apparatus of claim 3, in addition to an advantageous effect of the wind direction adjustment apparatus of claim 1 or 2, in addition to adjusting the wind direction by moving the wind direction adjustment body, the wind direction can be adjusted by pivoting of the fin in a direction intersecting with a wind direction adjustable direction. Therefore, the wind direction is more freely adjusted.

According to the wind direction adjustment apparatus according to claim 4, in addition to an advantageous effect of the wind direction adjustment apparatus according to any one of claims 1 to 3, an operation direction of the operation section and a wind direction adjustment direction of the wind direction adjustment body coincide or substantially coincide with each other. Therefore, the wind direction can be intuitively operated.

DESCRIPTION OF EMBODIMENTS

Hereinafter, an embodiment 1 of the present invention will be described with reference to the drawings.

Figure 6:
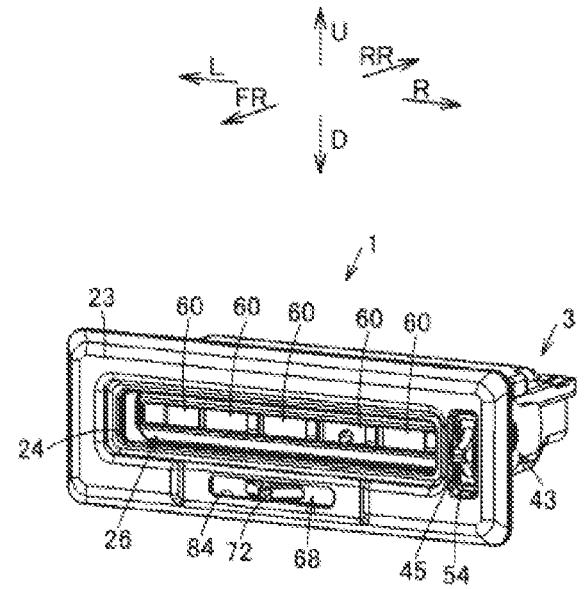
FIG. 6 is a perspective view of the wind direction adjustment apparatus.

In FIG. 6, a reference number 1 represents a wind direction adjustment apparatus. The wind direction adjustment apparatus 1 is also called an air outlet, a ventilator, or a register, and adjusts a wind blowing direction from an air conditioner. Hereinafter, for more clear description, in the wind direction adjustment apparatus 1, a leeward side from which wind blows will be defined as a front side, a front surface side, or a near side. A side opposite thereto, that is, a windward side which receives the wind will be defined as a rear side, a back side, or a far side. In this manner, a both side direction or a width direction which is a rightward-leftward direction when viewed from the front side, and an upward-downward direction will be defined. In the present embodiment, the wind direction adjustment apparatus 1 is applied to an air conditioner for a vehicle such as an automobile. The wind direction adjustment apparatus 1 is disposed at any desired position. In the drawings, an arrow FR side will be defined as the front side, an arrow RR side will be defined the rear side, an arrow L side will be defined as a left side, an arrow R side will be defined as a right side, an arrow U side will be defined as an upper side, and an arrow D side will be defined as a lower side. The directions are shown only as examples, and is changed as appropriate depending on an installation position or an installation orientation of the wind direction adjustment apparatus 1.

As shown in FIGS. 1 to 3 and 5, the wind direction adjustment apparatus 1 includes a case body 3. The case body 3 is also called a duct. The case body 3 is formed in a cylindrical shape. In the present embodiment, the case body 3 is formed in a cylindrical shape in a forward-rearward direction. In the shown example, the case body 3 is formed in a rectangular cylindrical shape. A ventilation passage 5 is internally surrounded by the case body 3. A direction parallel to a central axis of the case body 3 is a ventilation direction of the ventilation passage 5. In the present embodiment, the ventilation direction of the ventilation passage 5 is the forward-rearward direction, and ventilation is performed from the rear side to the front side. That is, in the ventilation passage 5, the rear side is an upstream side in the ventilation direction, and the front side is a downstream side in the ventilation direction.

The case body 3 has a predetermined length in the ventilation direction of the ventilation passage 5. In the present embodiment, the case body 3 is flat in an upward-downward direction, and is formed in a longitudinal shape in the rightward-leftward direction, that is, in a horizontally elongated shape. Therefore, the wind direction adjustment apparatus 1 is formed in a horizontally thin shape. The case body 3 integrally has a central portion of the ventilation passage 5, that is, a pair of end wall portions 6 facing each other across the central axis, and a pair of side wall portions 7 joining the pair of end wall portions 6. The pair of end wall portions 6 face each other in the upward-downward direction, and the pair of side wall portions 7 face each other in the rightward-leftward direction. A receiving port 8 for receiving air, that is, air-conditioned wind into the ventilation passage 5, is surrounded by rear end portions of the pair of end wall portions 6 and 6 and the pair of side wall portions 7 and 7. A discharge port 9 for discharging the air-conditioned wind from the ventilation passage 5 is surrounded by front end portions of the pair of end wall portions 6 and 6 and the pair of side wall portions 7 and 7. That is, the rear end portion of the case body 3 serves as the receiving port 8 for receiving the air-conditioned wind into the ventilation passage 5, and the front end portion of the case body 3 serves as the discharge port 9 for discharging the air-conditioned wind from the ventilation passage 5. The ventilation passage 5 allowing communication is formed between the receiving port 8 and the discharge port 9. The air-conditioned wind passes from the receiving port 8 to the discharge port 9. The receiving port 8 and the discharge port 9 respectively have the horizontally elongated shape.

Figure 5:
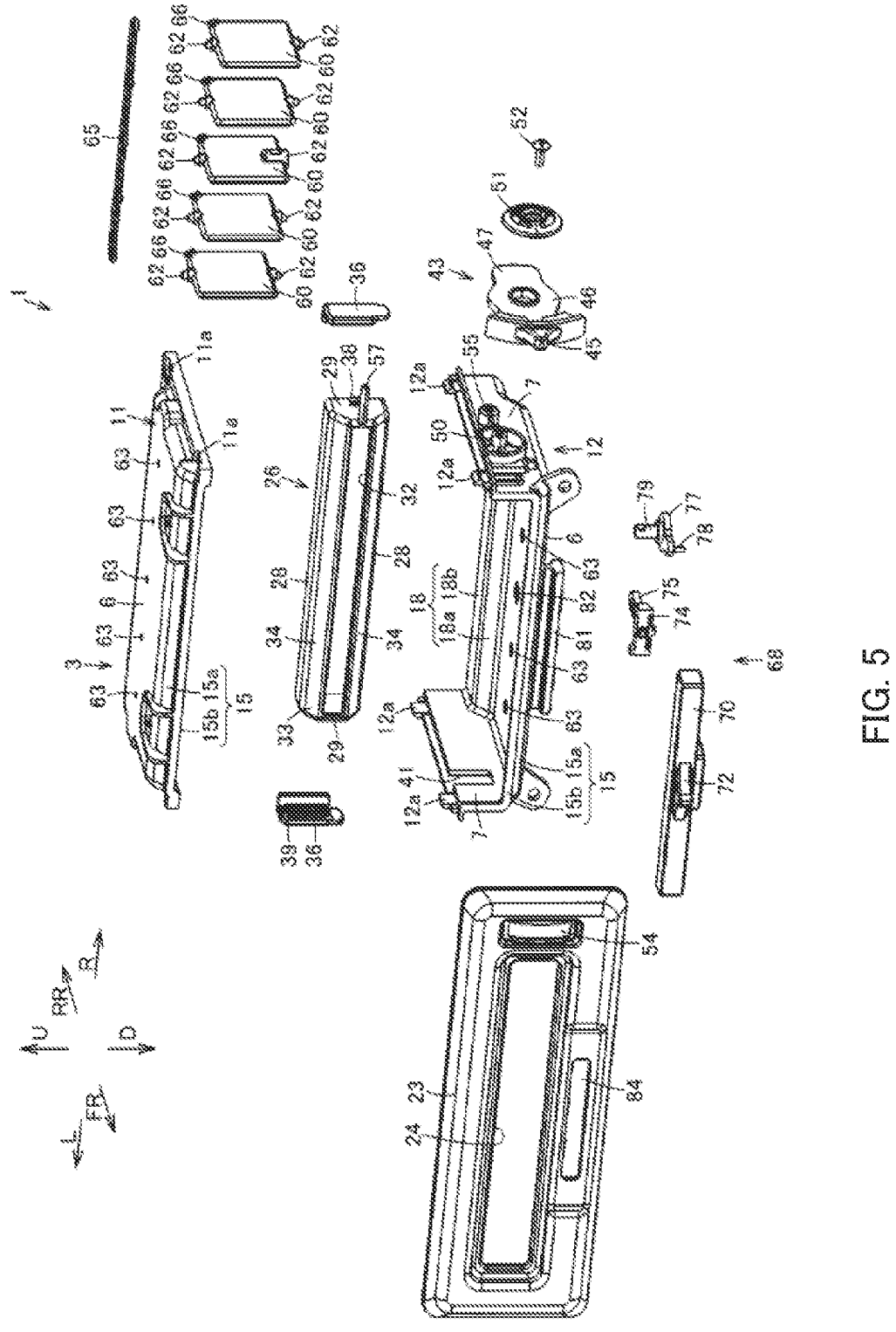
FIG. 5 is an exploded perspective view of the wind direction adjustment apparatus.

As shown in FIG. 5, the case body 3 may be integrally formed, or may be formed by combining a plurality of members. In the present embodiment, the case body 3 is formed by combining one case member 11 and the other case member 12. One case member 11 is formed so that one end wall portion 6 is configured. The other case member 12 is formed so that the other end wall portion 6 and the side wall portions 7 and 7 are configured. In the shown example, one locking portion 11a is formed in one case member 11, and the other locking portion 12a is formed in an upper portion of the other case member 12. The one locking portion 11a and the other locking portion 12a are locked to each other. In this manner, the case body 3 is formed in a cylindrical shape. For example, one of the locking portion 11a and the other locking portion 12a is formed as a hole portion, and the other is formed as a claw portion. In the present embodiment, one locking portion 11*a* is the hole portion, and the other locking portion 12*a* is the claw portion.

In addition, as shown in FIGS. 1 to 5, the case body 3 is contracted on the discharge port 9 side which is one end side, that is, on the downstream side in the ventilation direction. In the case body 3, the front end portion which is the discharge port 9 side is contracted in a predetermined direction, that is, in the upward-downward direction which is a short direction of the discharge port 9 in the present embodiment. That is, a downstream side contraction portion 14 which is (one) contraction portion is formed in the front end portion which is a downstream end portion of the case body 3. The downstream side contraction portion 14 is located forward away from a central portion of the case body 3 in the forward-rearward direction. In the present embodiment, the downstream side contraction portions 14 are formed up and down by a downstream side wind guide portion 15 which is (one) wind guide portion formed in the front end portion of each end wall portion 6, and the downstream side contraction portions 14 are formed right and left by the side wall portions 7. The discharge port 9 is surrounded by the pair of downstream side wind guide portions 15 and the pair of side wall portions 7.

The downstream side wind guide portion 15 has a downstream side inclined portion 15*a* which is (one) inclined portion. The downstream side inclined portion 15*a* is inclined forward on the central axis side of the case body 3. That is, the downstream side inclined portion 15*a* of the downstream side wind guide portion 15 on the upper side is inclined forward and downward, and the downstream side inclined portion 15*a* of the downstream side wind guide portion 15 on the lower side is inclined forward and upward. In the shown example, the downstream side inclined portions 15*a* are inclined symmetrically or substantially symmetrically to each other in the upward-downward direction. In the present embodiment, a downstream side non-inclined portion 15*b* which is (one) non-inclined portion is integrally formed by being connected to the front end portion of the downstream side inclined portion 15*a*. The downstream side non-inclined portion 15*b* is a portion extending forward from the front end portion of the downstream side inclined portion 15*a*. In the shown example, the downstream side non-inclined portion 15*b* is formed parallel or substantially parallel to an axial direction of the case body 3. In the present embodiment, the downstream side non-inclined portion 15*b* is formed to be shorter in the forward-rearward direction, compared to the downstream side inclined portion 15*a*. The downstream side non-inclined portion 15*b* forms the front end portion of the downstream side wind guide portion 15. The downstream side non-inclined portion 15*b* is not an essential configuration.

In addition, in the present embodiment, the case body 3 is contracted on the receiving port 8 side which is the other end side, that is, on the upstream side in the ventilation direction. In the case body 3, the rear end portion on the receiving port 8 side is contracted in a predetermined direction, that is, in the upward-downward direction which is the short direction of the receiving port 8 in the present embodiment. That is, an upstream side contraction portion 17 which is (the other) contraction portion is formed in the rear end portion which is an upstream end portion of the case body 3. The upstream side contraction portion 17 is located rearward away from the central portion of the case body 3 in the forward-rearward direction. In the present embodiment, the upstream side contraction portions 17 are formed up and down by an upstream side wind guide portion 18 which is (the other)

wind guide portion formed in the rear end portion of each end wall portion 6, and the upstream side contraction portions 17 are formed right and left by the side wall portions 7. The receiving port 8 is surrounded by the pair of upstream side wind guide portions 18 and the pair of side wall portions 7.

The upstream side contraction portion 17 has an upstream side inclined portion 18*a* which is (the other) inclined portion. The upstream side inclined portion 18*a* is inclined rearward on the central axis side of the case body 3. That is, the upstream side inclined portion 18*a* of the upstream side wind guide portion 18 on the upper side is inclined rearward and downward, and the upstream side inclined portion 18*a* of the upstream side wind guide portion 18 on the lower side is inclined rearward and upward. In the shown example, the upstream side inclined portions 18*a* are inclined symmetrically or substantially symmetrically to each other in the upward-downward direction. In the present embodiment, an upstream side non-inclined portion 18*b* which is (the other) non-inclined portion is integrally formed by being connected to the rear end portion of the upstream side inclined portion 18*a*. The upstream side non-inclined portion 18*b* is a portion extending rearward from the rear end portion of the upstream side inclined portion 18*a*. In the shown example, the upstream side non-inclined portion 18 *b* is formed parallel or substantially parallel to the axial direction of the case body 3. In the present embodiment, the upstream side non-inclined portion 18*b* is formed to be longer in the forward-rearward direction, compared to the upstream side inclined portion 18*a*. The upstream side non-inclined portion 18*b* forms the rear end portion of the upstream side wind guide portion 18. The upstream side non-inclined portion 18*b* is not an essential configuration.

In the case body 3, a general portion 20 is provided between the downstream side contraction portion 14 and the upstream side contraction portion 17. That is, the downstream side contraction portion 14 is connected to a front portion of the general portion 20, and the upstream side contraction portion 17 is connected to a rear portion of the general portion 20. The general portion 20 is a non-contraction portion which is not contracted in the axial direction of the case body 3. In the general portion 20, a cross-sectional area of the ventilation passage 5 is constant or substantially constant.

In addition, a panel 23 forming a design portion is attached to a front end portion on the discharge port 9 side in the case body 3. The panel 23 is also called a finisher, and forms a portion of the design at an installation position of the wind direction adjustment apparatus 1. The panel 23 protrudes outward in a flange shape from the front end portion of the case body 3. In the present embodiment, the panel 23 is formed to be long in the rightward-leftward direction and to be short in the upward-downward direction. That is, the panel 23 is formed in a horizontally elongated shape. An air outlet 24 communicating with the discharge port 9 is formed in the panel 23. The air outlet 24 is a portion from which the air-conditioned wind passing through the ventilation passage 5 blows. The air outlet 24 is formed in a shape substantially equal to that of the discharge port 9. That is, the air outlet 24 is formed in a longitudinal shape in the rightward-leftward direction, that is, in a horizontally elongated shape.

A wind direction adjustment body 26 for adjusting the wind direction of the air-conditioned wind blowing from the air outlet 24 in accordance with a movement with respect to the case body 3 is disposed inside the case body 3, that is, in the ventilation passage 5. The wind direction adjustment body 26 is also called a housing. The wind direction adjustment body 26 is formed in a cylindrical shape. In the present embodiment, the wind direction adjustment body 26 is formed in a cylindrical shape in the forward-rearward direction. In the shown example, the wind direction adjustment body 26 is formed in a rectangular cylindrical shape. The wind direction adjustment body 26 is disposed while the axial direction is set as the forward-rearward direction. The inside of the wind direction adjustment body 26 communicates with the ventilation passage 5.

Figure 1:
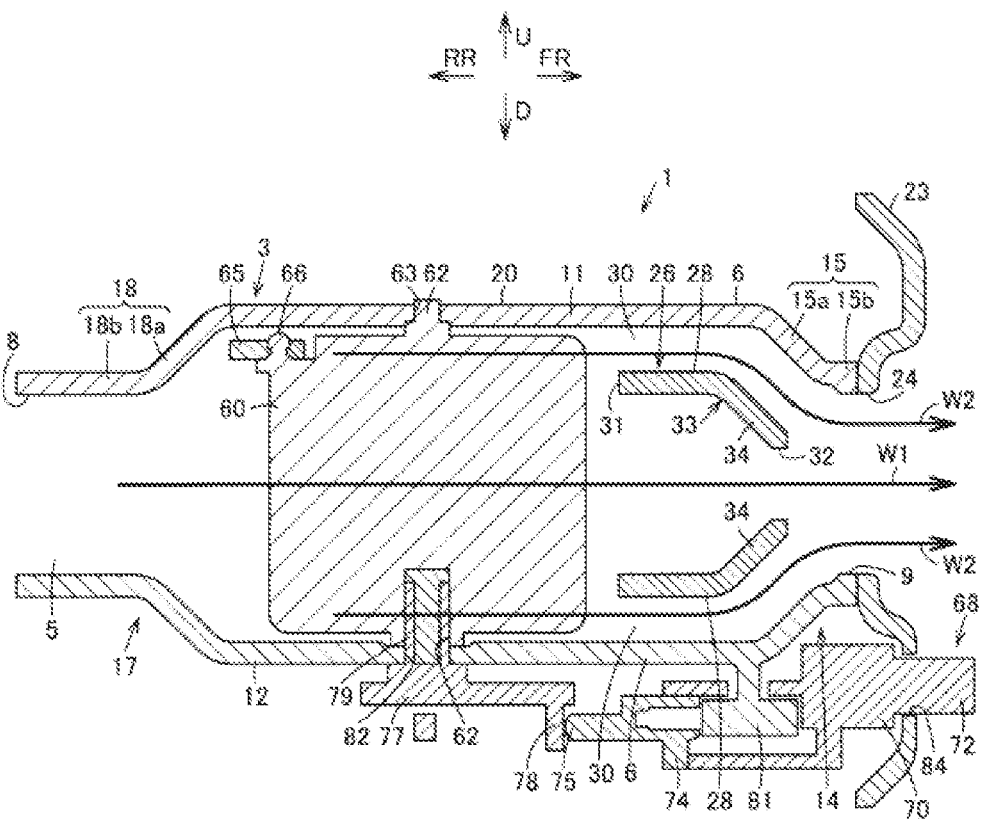
FIG. 1 is a longitudinal sectional view showing a neutral state of a wind direction adjustment body of a wind direction adjustment apparatus according to an embodiment 1 of the present invention.
Figure 2:
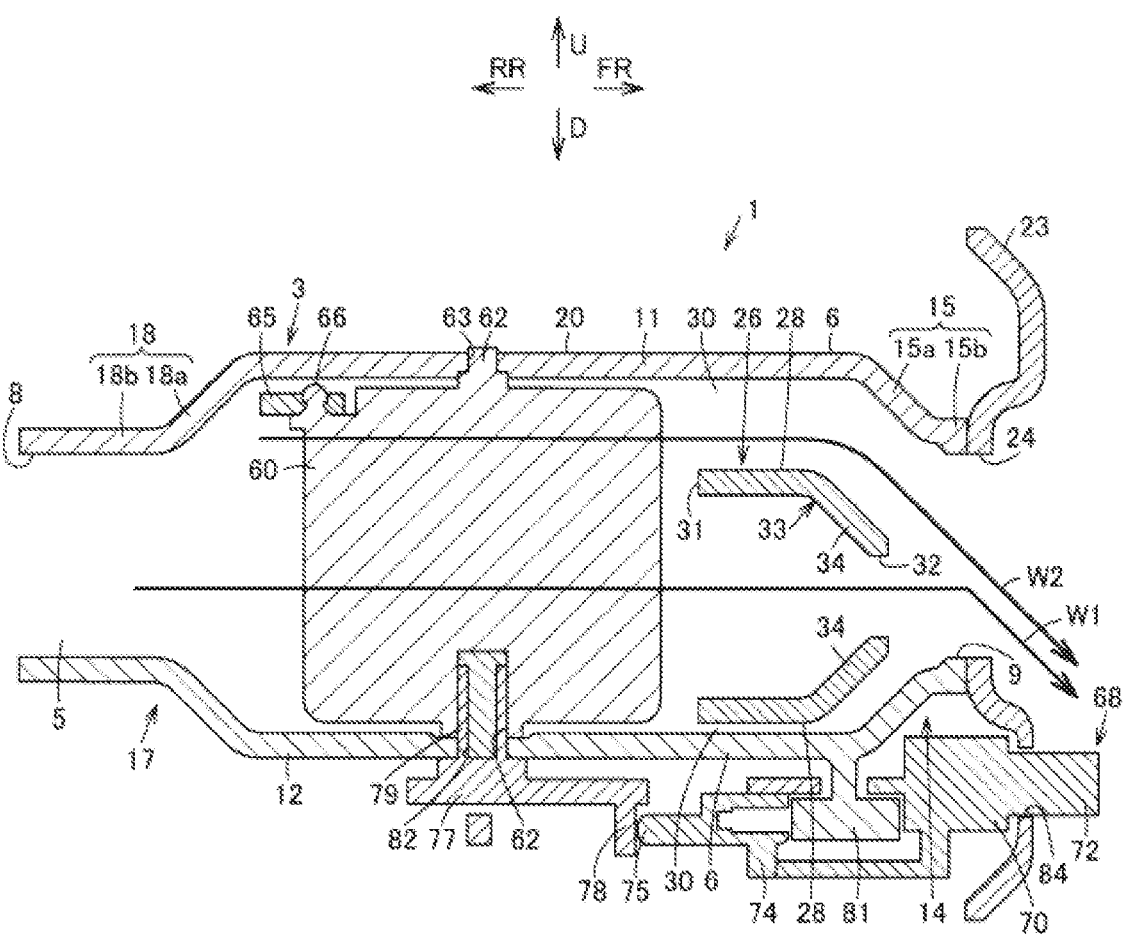
FIG. 2 is a longitudinal sectional view showing a wind distribution state of the wind direction adjustment body of the wind direction adjustment apparatus.
Figure 3A:
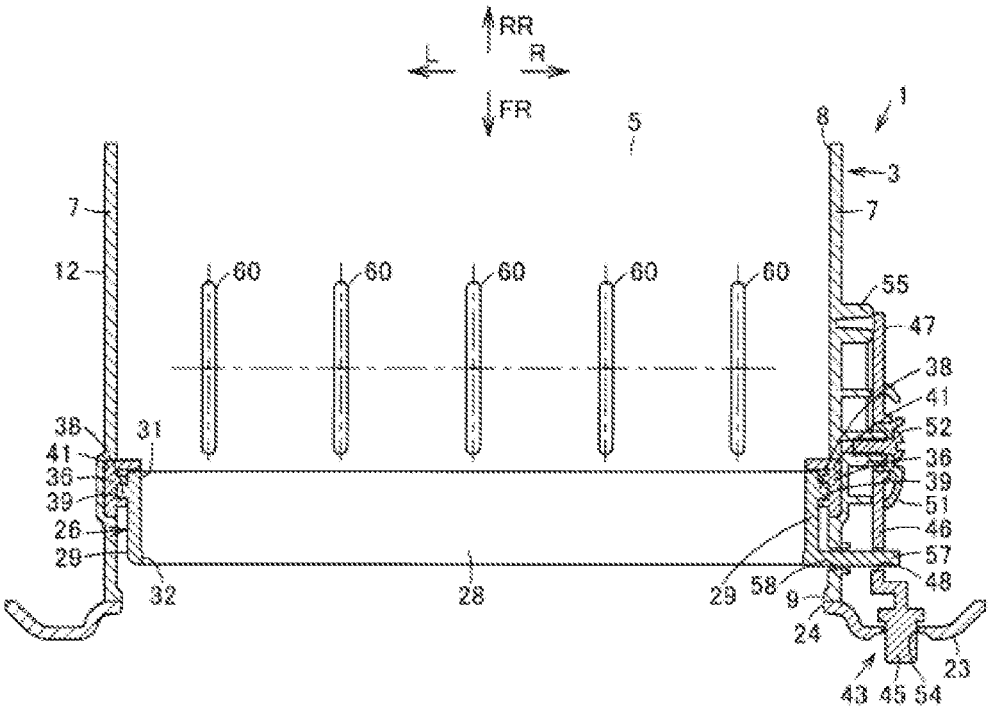
FIG. 3A is a cross-sectional view of the wind direction adjustment apparatus.

In the present embodiment, the wind direction adjustment body 26 is flat in the upward-downward direction in accordance with a shape of the case body 3, and is formed in a longitudinal shape in the rightward-leftward direction, that is, in a horizontally elongated shape. The wind direction adjustment body 26 integrally has a pair of end walls 28 facing each other across the central axis and a pair of side walls 29 joining the pair of end walls 28. The pair of end walls 28 face each other in the upward-downward direction, and the pair of side walls 29 face each other in the rightward-leftward direction. The pair of end walls 28 extend in a longitudinal shape in the rightward-leftward direction. In addition, as shown in FIGS. 1 and 2, a length of the wind direction adjustment body 26 in the upward-downward direction, that is, a direction intersecting with or orthogonal to the axial direction (ventilation direction) is set to be smaller than a length of the ventilation passage 5 in the upward-downward direction. Therefore, flow paths 30 through which the air-conditioned wind can pass are respectively defined inside the ventilation passage 5 between the pair of end walls 28 and the pair of end wall portions 6 of the case body 3. In addition, as shown in FIG. 3A, the pair of side walls 29 are located close to the pair of side wall portions 7 of the case body 3, and a flow path through which the air-conditioned wind passes is not formed between the pair of side walls 29 and the pair of side wall portions 7.

In addition, as shown in FIGS. 1 to 3, the length of the wind direction adjustment body 26 in the forward-rearward direction, that is, in the axial direction is set to be shorter than half the length of the case body 3 in the axial direction, and in the shown example, the length is set to be approximately ¼. The pair of end walls 28 and the pair of side walls 29 form the wind direction adjustment body 26 in a rectangular frame shape. The rear end portions of the pair of end walls 28 and 28 and the pair of side walls 29 and 29 surround an introduction port 31 for receiving the air-conditioned wind into the wind direction adjustment body 26. The front end portions of the pair of end walls 28 and 28 and the pair of side walls 29 and 29 surround a deriving port 32 for deriving the air-conditioned wind. The introduction port 31 and the deriving port 32 are respectively formed in a horizontally elongated shape. In the present embodiment, an opening area of the introduction port 31 is set to be equal to or larger than half the cross-sectional area of the ventilation passage 5. Preferably, the opening area of the introduction port 31 is set to be equal to or smaller than ¾ of the cross-sectional area of the ventilation passage 5.

Preferably, in the wind direction adjustment body 26, the deriving port 32 side which is one end side, that is, the downstream side in the ventilation direction, is contracted in a direction in which the discharge port 9 side which is one end side of at least the case body 3, that is, the downstream side, is contracted. That is, in the present embodiment, in the wind direction adjustment body 26, the front end portion on the deriving port 32 side is contracted in the upward-downward direction which is the short direction of the deriving port 32. That is, an adjustment body contraction portion 33 is formed in the front end portion which is the downstream end portion of the wind direction adjustment body 26. In the present embodiment, the adjustment body contraction portions 33 are formed up and down by the adjustment body wind guide portions 34 and 34 formed in the front end portions of the end walls 28 and 28, and the adjustment body contraction portions 33 are formed right and left by the side walls 29 and 29. The deriving port 32 is surrounded by the adjustment body wind guide portions 34 and 34 and the side walls 29 and 29.

The adjustment body wind guide portion 34 is inclined forward on the central axis side of the wind direction adjustment body 26. That is, the adjustment body wind guide portion 34 on the upper side is inclined forward and downward, and the adjustment body wind guide portion 34 on the lower side is inclined forward and upward. In the shown example, the adjustment body wind guide portions 34 and 34 are inclined symmetrically or substantially symmetrically to each other in the upward-downward direction. In addition, the inclination of the adjustment body wind guide portion 34 is parallel or substantially parallel to the downstream side inclined portion 15a of the case body 3.

The wind direction adjustment body 26 is disposed inside the front end side which is one end side of the case body 3. In the wind direction adjustment body 26, at least the front end side of the adjustment body wind guide portion 34 is located inside the downstream side contraction portion 14 of the case body 3, and the other general portion is located inside the general portion 20 of the case body 3.

Therefore, in a flow path 30 between the wind direction adjustment body 26 and the case body 3, the upstream side located inside the general portion 20 of the case body 3 is linearly inclined in the forward-rearward direction. Due to the inclination between the adjustment body wind guide portion 34 of the wind direction adjustment body 26 and the downstream side inclined portion 15a of the case body 3, a downstream end of the flow path 30 on the upper side is inclined downward, and a downstream end of the flow path 30 on the lower side is inclined upward.

Figure 3B:
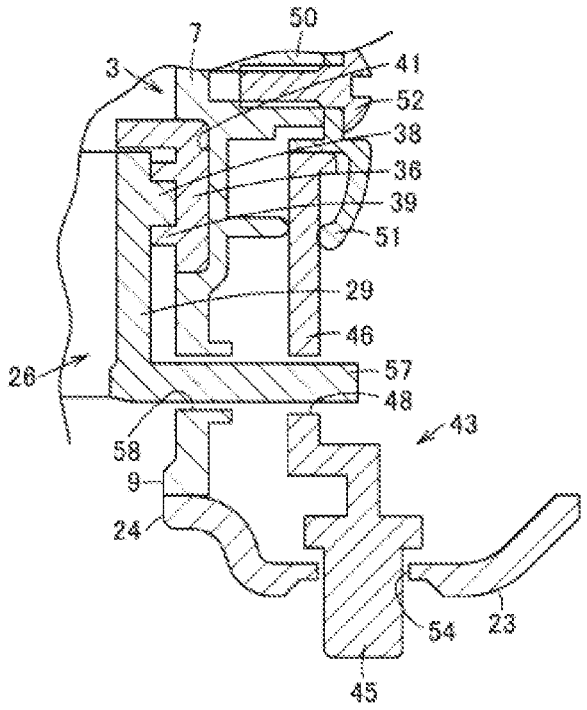
FIG. 3B is a cross-sectional view showing a part in FIG. 3A.

In addition, the wind direction adjustment body 26 is disposed to be movable with respect to the case body 3 in a direction intersecting with at least the ventilation direction, that is, in the upward-downward direction in the present embodiment. That is, the wind direction adjustment body 26 is disposed to be movable in a predetermined direction in which the downstream side contraction portion 14 is contracted. As shown in FIGS. 3A, 3B, and 5, in the present embodiment, the wind direction adjustment body 26 is held to be slidable by the receiving portion 36, and the receiving portion 36 is fixed to the case body 3. In this manner, the wind direction adjustment body 26 is movable with respect to the case body 3 in the upward-downward direction. As shown in FIGS. 1 and 2, a ratio of a ventilation amount (opening area) between one flow path 30 and the other flow path 30 is changed in accordance with a movement direction and a movement amount of the wind direction adjustment body 26. In this manner, the ratio of the ventilation amount blowing in the direction in which the downstream side contraction portion 14 is contracted, that is, in a direction along an inclination direction of the downstream side inclined portion 15a of the downstream side wind guide portion 15 is changed. Accordingly, the wind direction of the wind blowing form the air outlet 24 is changed.

The receiving portion 36 shown in FIG. 3B is also called a spacer. The receiving portion 36 holds each of both end portions in a longitudinal direction of the wind direction adjustment body 26, in the present embodiment, each of both right and left side portions. The receiving portion 36 has a guide portion 39 for guiding a sliding contact portion 38 formed on the side wall 29 of the wind direction adjustment body 26 to be in slidable contact. One of the sliding contact portion 38 and the guide portion 39 is a recessed portion, and the other is a projecting portion. In the present embodiment, the sliding contact portion 38 is the projecting portion, and the guide portion 39 is a linear rail-shaped groove portion, that is, the recessed portion.

The receiving portion 36 is attached and fixed to an attachment portion 41 formed on the side wall portion 7 of the case body 3. In the present embodiment, the attachment portion 41 is a groove portion formed in the upward-downward direction on an inner surface of the side wall portion 7 of the case body 3, that is, a surface on the ventilation passage 5 side. In the shown example, the attachment portion 41 is formed as the groove portion connected to the upper end portion of the side wall portion 7 in the other case member 12. Therefore, the receiving portion 36 is slidably inserted and fitted into the attachment portion 41 from above with respect to the other case member 12, and one case member 11 is fixed to the other case member 12. In this manner, the upper end portion of the attachment portion 41 is closed so that the receiving portion 36 is retained and held by the case body 3.

Figure 4A:
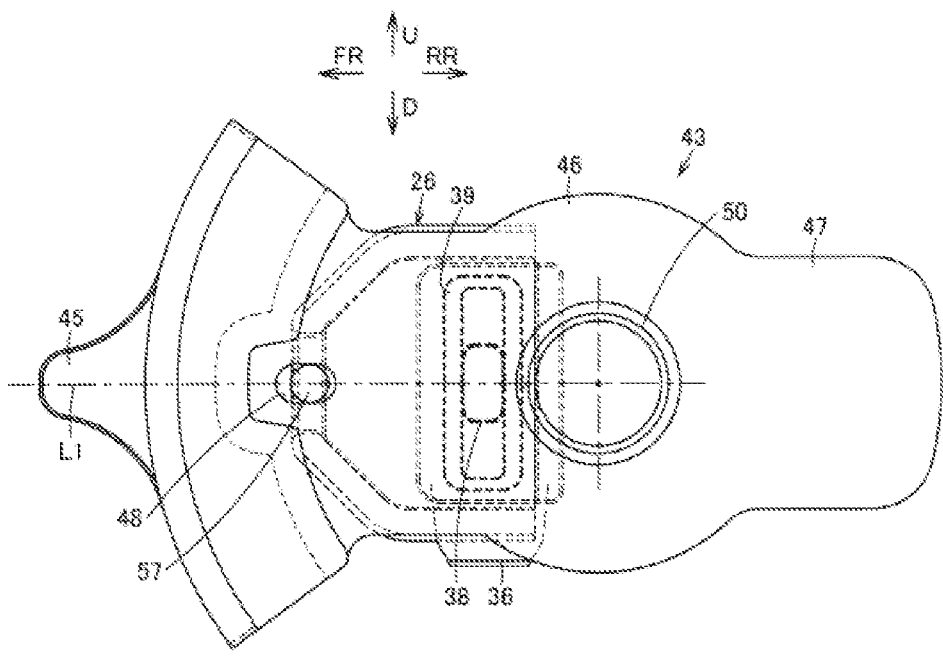
FIG. 4A is a side view showing an operation section in a neutral state of the wind direction adjustment body of the wind direction adjustment apparatus.
Figure 4B:
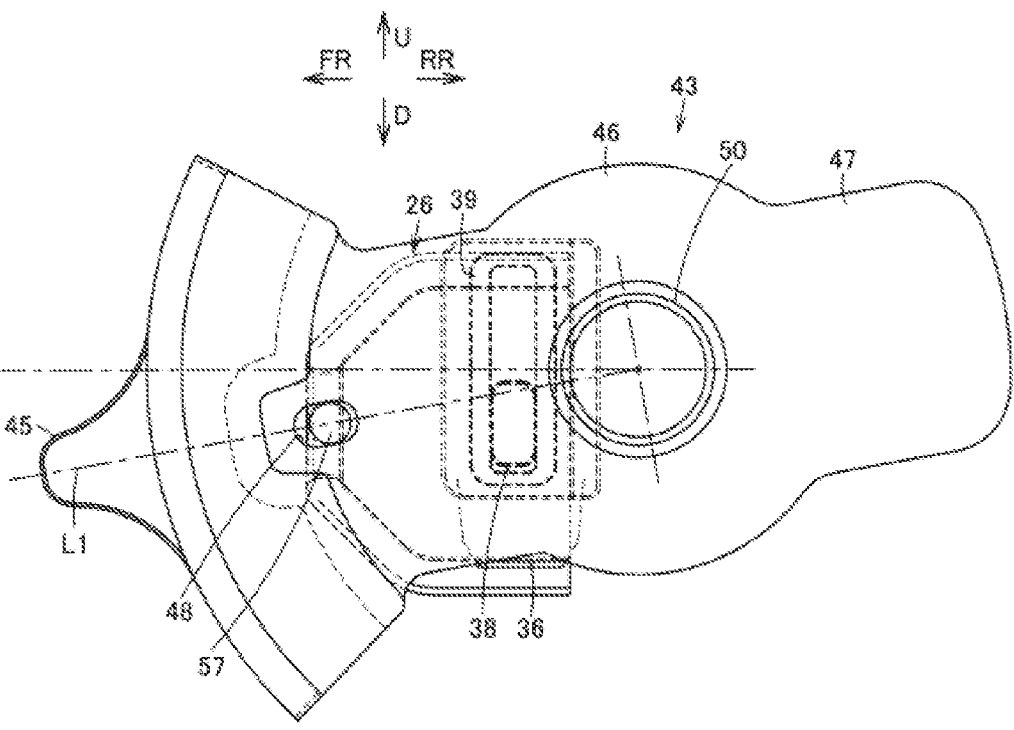
FIG. 4B is a side view showing the operation section in a wind distribution state where the wind direction adjustment body is moved.

In the present embodiment, the wind direction adjustment body 26 can be operated by an operation section 43 disposed to be movable outside the case body 3. For example, the operation section 43 is a pivotally operated operation dial. As shown in FIGS. 4A and 4B, the operation section 43 has a gripping portion 45. The gripping portion 45 is a portion gripped by a user such as an occupant to cause the operation section 43 to pivot. An operation section main body portion 46 serving as a pivoting center of the operation section 43 is formed on the back side of the gripping portion 45. In addition, a stopper portion 47 is formed on the back side of the operation section main body portion 46. A link hole portion 48 joined to the wind direction adjustment body 26 is formed on a virtual line L1 connecting the center of the operation section main body portion 46, that is, the pivoting center, and the gripping portion 45. In the present embodiment, the link hole portion 48 has an elongated shape along the virtual line L1 connecting the center of the operation section main body portion 46, that is, the pivoting center, and the gripping portion 45.

As shown in FIG. 5, in the operation section 43, the operation section main body portion 46 is pivotably attached to a side portion of the case body 3. In the shown example, in the operation section 43, the operation section main body portion 46 is coaxially attached to a boss-shaped operation section attachment portion 50 formed on an outer surface of one side wall portion 7 of the case body 3 via a cylindrical bush 51 by a fixing member 52 such as a tapping. The operation section attachment portion 50 is disposed behind the attachment portion 41 on one side wall portion 7 of the case body 3.

As shown in FIG. 3A, in a state where the operation section 43 is attached to the case body 3, the gripping portion 45 is located on the front side, and the stopper portion 47 is located on the rear side. The gripping portion 45 is inserted into an exposed opening portion 54 formed in a lateral portion of the air outlet 24 in the panel 23, and protrudes forward from the panel 23. In addition, the stopper portion 47 is located in a lower portion of a contact portion 55 formed on the outer surface of one side wall portion 7 of the case body 3, and the stopper portion 47 and the contact portion 55 come into contact with each other when the operation section 43 pivots. In this manner, a pivoting angle of the operation section 43 is regulated.

In addition, as shown in FIG. 3B, a link portion 57 formed in the wind direction adjustment body 26 is inserted into the link hole portion 48 of the operation section 43. The link portion 57 protrudes from one side wall 29 of the wind direction adjustment body 26. In the present embodiment, the link portion 57 is a shaft portion laterally protruding from the front end portion of one side wall 29 of the wind direction adjustment body 26. The link portion 57 is inserted into an insertion hole portion 58 formed in one side wall portion 7 of the case body 3, is derived outward of the ventilation passage 5, that is, outward of the case body 3, and is inserted into the link hole portion 48. The insertion hole portion 58 is formed along the movement direction of the wind direction adjustment body 26 with respect to the case body 3. In the present embodiment, the insertion hole portion 58 is formed in an elongated hole shape in the upward-downward direction.

Furthermore, preferably, as shown in FIGS. 1 and 2, inside the case body 3, that is, in the ventilation passage 5, fins 60 are disposed on the upstream side of the wind direction adjustment body 26. The fin 60 is also called a louver. In the present embodiment, the fin 60 is located to be separated rearward from the wind direction adjustment body 26, and is disposed inside the general portion 20 of the case body 3. The fin 60 is formed in a plate shape, and pivots in a direction intersecting with each of the ventilation direction and the movement direction of the wind direction adjustment body 26. In this manner, the wind direction can be adjusted in the pivoting direction. In the present embodiment, the fin 60 is disposed in the ventilation passage 5 while a main surface serving as a flow straightening surface is directed rightward and leftward, and the wind direction can be adjusted in the rightward-leftward direction. That is, the fin 60 is supported by the case body 3 to be pivotable in the rightward-leftward direction. The fin 60 has a pivoting portion 62, and the pivoting portion 62 is held by a pivoting receiving portion 63 formed on each end wall portion 6 of the case body 3, and is pivotable in the rightward-leftward direction. One of the pivoting portion 62 and the pivoting receiving portion 63 is a shaft portion, and the other is a hole portion or a recessed portion.

In addition, as shown in FIGS. 3A and 5, a plurality of the fins 60 are set in the present embodiment. The fins 60 are joined to each other by a link 65 to pivot in the same direction by being interlocked with each other. The link 65 is pivotably joined to a link receiving portion 66 formed at a position separated from the pivoting portion 62 in the fin 60. In the shown example, the link receiving portion 66 is formed in the upper portion of the rear end portion of the fin 60.

In the present embodiment, the fin 60 can be operated by a fin operation section 68 disposed outside the case body 3. For example, the fin operation section 68 is a slidably operated operation knob. As shown in FIGS. 1, 2, and 5, the fin operation section 68 has one fin operation section main body portion 70. The one fin operation section main body portion 70 is formed in a longitudinal shape. In the present embodiment, the one fin operation section main body portion 70 is formed in the longitudinal shape in the rightward-leftward direction which is a sliding direction of the fin operation section 68 or a pivoting direction of the fin 60. A gripping portion 72 is formed in the front portion of the one fin operation section main body portion 70. The gripping portion 72 is a portion gripped by a user such as an occupant to slide the fin operation section 68.

The other fin operation section main body portion 74 is joined to the back side of the one fin operation section main body portion 70, that is, to the side opposite to the gripping portion 72. The other fin operation section main body portion 74 moves integrally with the one fin operation section main body portion 70.

A joining portion 75 is formed on the back side of the other fin operation section main body portion 74, that is, on the side opposite to the one fin operation section main body portion 70. A joining body 77 is joined to the joining portion 75. The joining body 77 is a direction conversion portion that converts sliding of the one fin operation section main body portion 70 into pivoting of the fin 60. A joining receiving portion 78 joined to the joining portion 75 is formed in the joining body 77. The joining receiving portion 78 is pivotably joined to the joining portion 75. One of the joining receiving portion 78 and the joining portion 75 is a shaft portion, and the other is a hole portion or a recessed portion. In the present embodiment, the joining receiving portion 78 is the shaft portion, and the joining portion 75 is the hole portion. In addition, a fin joining portion 79 joined to the fin 60 is formed in the joining body 77. The fin joining portion 79 is joined to the pivoting portion 62 of the fin 60. In the present embodiment, the fin joining portion 79 is joined to one of the pivoting portions 62 of the plurality of fins 60. In the shown example, the fin joining portion 79 is joined to the pivoting portion 62 of the fin 60 located at the central portion in the rightward-leftward direction in the plurality of fins 60. One of the fin joining portion 79 and the pivoting portion 62 is a shaft portion, and the other is a hole portion or a recessed portion. In the present embodiment, the fin joining portion 79 is the shaft portion, and the pivoting portion 62 is the hole portion or the recessed portion.

In the fin operation section 68, one fin operation section main body portion 70 and the other fin operation section main body portion 74 are attached to a fin operation section attachment portion 81 formed in the end wall portion 6 of the case body 3. The joining body 77 is pivotably attached to an attachment hole portion 82 formed in the end wall portion 6 of the case body 3. In the present embodiment, the fin operation section attachment portion 81 and the attachment hole portion 82 are formed in the end wall portion 6 on the lower side.

The fin operation section attachment portion 81 is a guide portion that guides the fin operation section 68 in the sliding direction. The fin operation section attachment portion 81 is formed in a rail shape elongated in the rightward-leftward direction which is the sliding direction of the fin operation section 68 or the pivoting direction of the fin 60. The fin operation section attachment portion 81 is attached so that one fin operation section main body portion 70 and the other fin operation section main body portion 74 are pinched in the forward-rearward direction.

The attachment hole portion 82 is formed in place of one of the pivoting receiving portions 63 of the case body 3. In the present embodiment, the fin joining portion 79 of the joining body 77 is inserted into the attachment hole portion 82, and extends into the ventilation passage 5. The pivoting portion 62 of one of the fins 60 is joined to the fin joining portion 79.

As shown in FIGS. 1 and 2, in a state where the fin operation section 68 is attached to the case body 3, the gripping portion 72 is located on the front side, is inserted into the exposed opening portion 84 formed below the air outlet 24 in the panel 23, and protrudes forward from the panel 23.

The wind direction adjustment apparatus 1 is disposed by joining the receiving port 8 to an air conditioner. The air-conditioned wind from the air conditioner passes through the ventilation passage 5 from the receiving port 8, is distributed by the fin 60 and the wind direction adjustment body 26, and blows from the air outlet 24.

As shown in FIG. 1, when the wind direction adjustment body 26 is located at a neutral position, a majority of the air-conditioned wind straightly moves into the wind direction adjustment body 26 via the introduction port 31 from the central portion in the upward-downward direction inside the ventilation passage 5 along the upstream side non-inclined portion 18b of the upstream side wind guide portion 18 of the upstream side contraction portion 17, and passes through the deriving port 32 in a state where a wind speed (pressure) is increased by the adjustment body wind guide portion 34 of the adjustment body contraction portion 33 (mainstream W1). The remainder is guided up and down inside the ventilation passage 5 along the upstream side inclined portion 18a of the upstream side wind guide portion 18 of the upstream side contraction portion 17, passes through the upper and lower flow paths 30 of the wind direction adjustment body 26, and passes along between the adjustment body wind guide portion 34 of the adjustment body contraction portion 33 and the downstream side inclined portion 15a of the downstream side wind guide portion 15 of the downstream side contraction portion 14 of the case body 3 (sidestream W2). Therefore, with regard to the wind direction of the air-conditioned wind, the air-conditioned wind (mainstream W1) linearly blowing from the deriving port 32 of the wind direction adjustment body 26 is dominant, and the air-conditioned wind blows in the axial direction of the case body 3, that is, in a front surface direction from the air outlet 24 along the ventilation direction of the ventilation passage 5.

In addition, when the wind direction of the wind blowing from the air outlet 24 is changed, a user such as an occupant grips the gripping portions 45 and 72, and operates the operation section 43 or the fin operation section 68 to operate the wind direction adjustment body 26 or the fin 60.

For example, with regard to the wind distribution in the upward-downward direction, when the gripping portion 45 is gripped to move the operation section 43 in the upward-downward direction, that is, to cause the operation section 43 to pivot, the wind direction adjustment body 26 joined to the operation section 43 by the link portion 57 is moved up and down in accordance with the pivoting direction of the operation section 43. More specifically, as shown in FIGS. 4A and 4B, when the operation section 43 pivots, the link hole portion 48 of the operation section 43 moves up and down when viewed from the center of the operation section main body portion 46. Therefore, when an external force is applied up and down to the link portion 57 inserted in the link hole portion 48, the wind direction adjustment body 26 having the link portion 57 is guided and moved in the upward-downward direction so that the sliding contact portion 38 comes into sliding contact along the guide portion 39 of the receiving portion 36. In this case, whereas the wind direction adjustment body 26 linearly moves in the upward-downward direction, the operation section 43 pivots. Therefore, the link portion 57 and the link hole portion 48 are positionally displaced in the forward-rearward direction, that is, in the radial direction of the pivoting of the operation section 43. However, since the link hole portion 48 is formed in an elongated hole shape in the radial direction of the pivoting of the operation section 43, the positional displacement can be absorbed by moving the link portion 57 inside the link hole portion 48.

FIG. 2 shows a state where the wind direction adjustment body 26 is swung to the maximum in a downward direction. In this way, when the wind direction adjustment body 26 is swung in the downward direction, the flow path 30 on the lower side of the wind direction adjustment body 26 is contracted, and the flow path 30 on the upper side is expanded in accordance with the movement amount of the wind direction adjustment body 26. In this manner, a wind volume of the air-conditioned wind blowing in the downward direction from the air outlet 24 along the inclination of the downstream end of the flow path 30 on the upper side increases, and a wind volume of the air-conditioned wind blowing in an upward direction from the air outlet 24 along the inclination of the downstream end of the flow path 30 on the lower side decreases. When the wind direction adjustment body 26 is swung to the maximum in the downward direction, the flow path 30 on the lower side of the wind direction adjustment body 26 is closed or substantially closed. Therefore, with regard to the wind direction of the air-conditioned wind, the air-conditioned wind (sidestream W2) directed in the downward direction from the passage on the upper side is dominant. Accordingly, the air-conditioned wind and the air-conditioned wind (mainstream W1) passing through the inside of the wind direction adjustment body 26 collide with each other, and the air-conditioned wind blowing from the air outlet 24 is adjusted in the downward direction in accordance with the movement amount of the wind direction adjustment body 26.

When the wind direction adjustment body 26 is swung in the upward direction, upward and downward operations are reversed from a state where the wind direction adjustment body 26 is swung in the downward direction. Therefore, illustration and detailed description will be omitted.

In the present embodiment, in a state where the wind direction adjustment body 26 is swung to the maximum in the downward direction or in the upward direction, the deriving port 32 of the wind direction adjustment body 26 is entirely located within a projection range of the ventilation direction of the air outlet 24. That is, the entire deriving port 32 is located within the projection range of the air outlet 24 in the ventilation direction, over an entire movement range of the wind direction adjustment body 26. In addition, the axial direction of the wind direction adjustment body 26 is kept parallel or substantially parallel to the axial direction of the case body 3. Accordingly, the downstream side contraction portion 14 of the case body 3 is not located on the projection in the ventilation direction of the wind direction adjustment body 26, that is, in the direction in which the air-conditioned wind blows from the deriving port 32. Therefore, the air-conditioned wind (mainstream W1) blowing forward from the deriving port 32 of the wind direction adjustment body 26 collides with the downstream side inclined portion 15a of the downstream side wind guide portion 15 of the downstream side contraction portion 14 of the case body 3, and straightly moves forward from the air outlet 24 without generating a turbulent flow.

In addition, with regard to the wind distribution in the rightward-leftward direction, when a user such as an occupant grips the gripping portion 72 and slides the fin operation section 68 rightward and leftward, the fin 60 joined to the fin operation section 68 by the joining body 77 pivots rightward and leftward in accordance with the sliding direction of the fin operation section 68. More specifically, when the fin operation section 68 is slid rightward and leftward, the other fin operation section main body portion 74 moves rightward and leftward together with one fin operation section main body portion 70, and the joining body 77 joined to the joining portion 75 of the other fin operation section main body portion 74 via the joining receiving portion 78 pivots rightward and leftward. Therefore, the fin 60 in which the pivoting portion 62 is joined to the fin joining portion 79 of the joining body 77 pivots in accordance with the pivoting of the joining body 77, and the other fin 60 joined to the fin 60 by the link 65 pivots in the same direction. Therefore, the air-conditioned wind passing through the ventilation passage 5 blows from the air outlet 24 after the wind direction is changed in the rightward-leftward direction along a flow straightening surface of the fin 60.

In this way, the air-conditioned wind can blow in any desired direction by combining the wind distribution of the wind direction adjustment body 26 in the upward-downward direction and the wind distribution of the fin 60 in the rightward-leftward direction.

According to the present embodiment, the wind direction adjustment body 26 is disposed to be movable in a predetermined direction along at least the contraction, inside the downstream side of the cylindrical case body 3 whose downstream side which is one end side is contracted in a predetermined direction. In this manner, the wind direction can be adjusted by changing a ratio of the wind volume of the air-conditioned wind passing through the flow path 30 between the wind direction adjustment body 26 inside the ventilation passage 5 and the case body 3 and blowing in the direction along the contraction from the downstream side of the case body 3 in accordance with the movement direction and the movement amount of the wind direction adjustment body 26 inside the case body 3. Therefore, it is not necessary to dispose the plurality of fins in the vicinity of the air outlet 24. The opening dimension of the air outlet 24 can be reduced, and an actual opening area can be easily secured. Without a need to use a complicated mechanism, the number of components can be reduced with a simple configuration. That is, the wind direction can be adjusted by moving the cylindrical wind direction adjustment body 26 with a simple configuration while improving the appearance. In addition, an installation position of the instrument panel in the vicinity of the air outlet 24 can be more freely designed.

The downstream side which is one end side of the wind direction adjustment body 26 is contracted in the same direction as that of the downstream side of at least the case body 3. In this manner, while a flow velocity of the air-conditioned wind (mainstream W1) passing through the inside of the wind direction adjustment body 26 and straightly blowing from the downstream side of the wind direction adjustment body 26 can be increased, directionality of the air-conditioned wind (sidestream W2) blowing in an inclined shape in a contracted direction from the downstream side of the flow path 30 between the wind direction adjustment body 26 and the case body 3 can be improved. Therefore, a wind direction adjustment function can be improved. Moreover, in the present embodiment, the wind direction adjustment body 26 is movable in the upward-downward direction. Accordingly, even in a state where the wind direction adjustment body 26 is moved, the direction of the air-conditioned wind (mainstream W1) blowing from the deriving port 32 of the wind direction adjustment body 26 is not changed. The inclination of the adjustment body wind guide portion 34 of the adjustment body contraction portion 33 of the wind direction adjustment body 26 and the inclination of the downstream side inclined portion 15a of the downstream side wind guide portion 15 of the downstream side contraction portion 14 of the case body 3 can be kept parallel or substantially parallel to each other. Therefore, the directionality of the air-conditioned wind (sidestream W2) blowing in an inclined shape along the contracted direction from the downstream side of the flow path 30 between the wind direction adjustment body 26 and the case body 3 can be reliably improved.

The fin 60 is pivotably disposed in the direction intersecting with the ventilation direction inside the case body 3 and the movement direction of the wind direction adjustment body 26, on the upstream side in the ventilation direction with respect to the wind direction adjustment body 26 inside the case body 3. Accordingly, in addition to adjusting the wind direction by moving the wind direction adjustment body 26, the wind direction can be adjusted by the pivoting of the fin 60 in the direction intersecting with the direction in which the wind direction can be adjusted. Therefore, the wind direction can be more freely adjusted.

The wind direction adjustment body 26 is movable along the movement direction of the operation section 43 movably disposed outside the case body 3, which is the pivoting direction in the present embodiment. Therefore, the operation direction of the operation section 43 and the wind direction adjustment direction of the wind direction adjustment body 26 coincide or substantially coincide with each other. Therefore, the wind direction can be intuitively operated.

Next, a embodiment 2 will be described with reference to FIGS. 7 and 8. The same reference numerals will be assigned to the same configurations and operations as those in the embodiment 1, and description thereof will be omitted.

The wind direction adjustment body 26 of the present embodiment is disposed to be pivotable with respect to the case body 3. That is, in the present embodiment, in the wind direction adjustment body 26, a support portion 86 is pivotably supported by the case body 3. In the shown example, the support portion 86 is formed on the side wall 29 of the wind direction adjustment body 26. As an example, the support portion 86 is formed at a position protruding rearward from the rear portion of the side wall 29. The support portion 86 is pivotably supported by the side wall portion 7 of the case body 3. Therefore, the wind direction adjustment body 26 of the present embodiment is pivotable in the upward-downward direction, that is, in the contracted direction of the downstream side contraction portion 14 on the downstream side which is one end side of the case body 3, that is, in the inclination direction of the downstream side inclined portion 15a of the downstream side wind guide portion 15.

In a case of this configuration, the operation section 43 may be directly joined to the support portion 86, and the wind direction adjustment body 26 may directly pivot by pivoting of the operation section 43.

Figure 7:
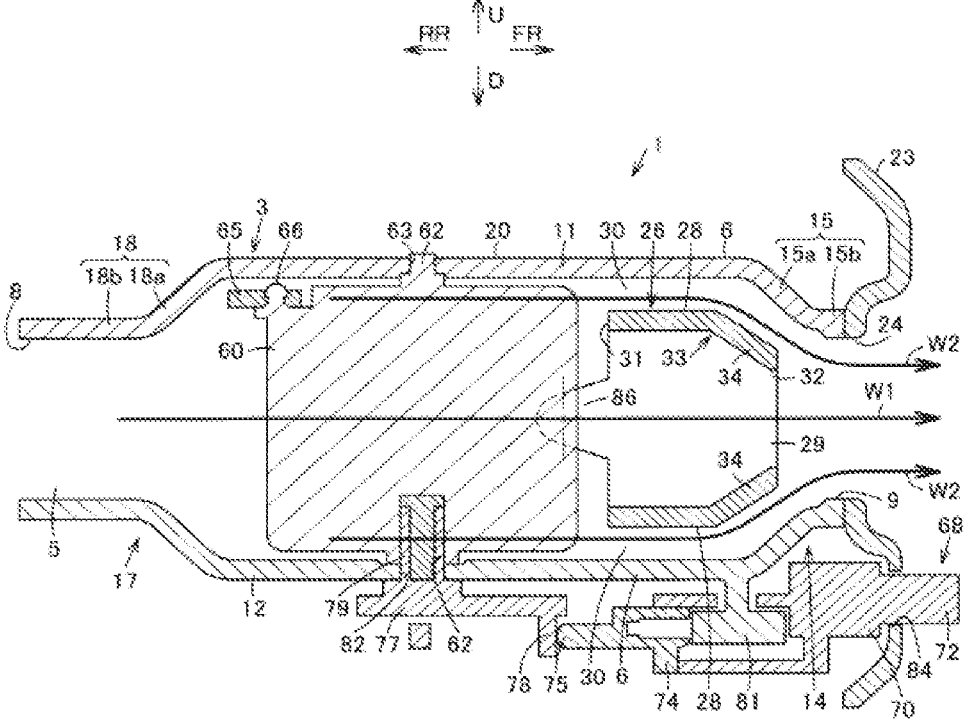
FIG. 7 is a longitudinal sectional view showing a neutral state of a wind direction adjustment body of a wind direction adjustment apparatus according to a embodiment 2 of the present invention.

As shown in FIG. 7, when the wind direction adjustment body 26 is located at a neutral position, a majority of the air-conditioned wind straightly moves into the wind direction adjustment body 26 via the introduction port 31 from the central portion in the upward-downward direction inside the ventilation passage 5 along the upstream side non-inclined portion 18b of the upstream side wind guide portion 18 of the upstream side contraction portion 17, and passes through the deriving port 32 in a state where a wind speed (pressure) is increased by the adjustment body wind guide portion 34 of the adjustment body contraction portion 33 (mainstream W1). The remainder is guided up and down inside the ventilation passage 5 along the upstream side inclined portion 18a of the upstream side wind guide portion 18 of the upstream side contraction portion 17, passes through the upper and lower flow paths 30 of the wind direction adjustment body 26, and passes along between the adjustment body wind guide portion 34 of the adjustment body contraction portion 33 and the downstream side inclined portion 15a of the downstream side wind guide portion 15 of the downstream side contraction portion 14 of the case body 3 (sidestream W2). Therefore, with regard to the wind direction of the air-conditioned wind, the air-conditioned wind (mainstream W1) linearly blowing from the deriving port 32 of the wind direction adjustment body 26 is dominant, and the air-conditioned wind blows in the axial direction of the case body 3, that is, in a front surface direction from the air outlet 24 along the ventilation direction of the ventilation passage 5.

In addition, for example, the wind distribution in the upward-downward direction is adjusted by causing the operation section 43 to pivot up and down so that the wind direction adjustment body 26 pivots up and down.

Figure 8:
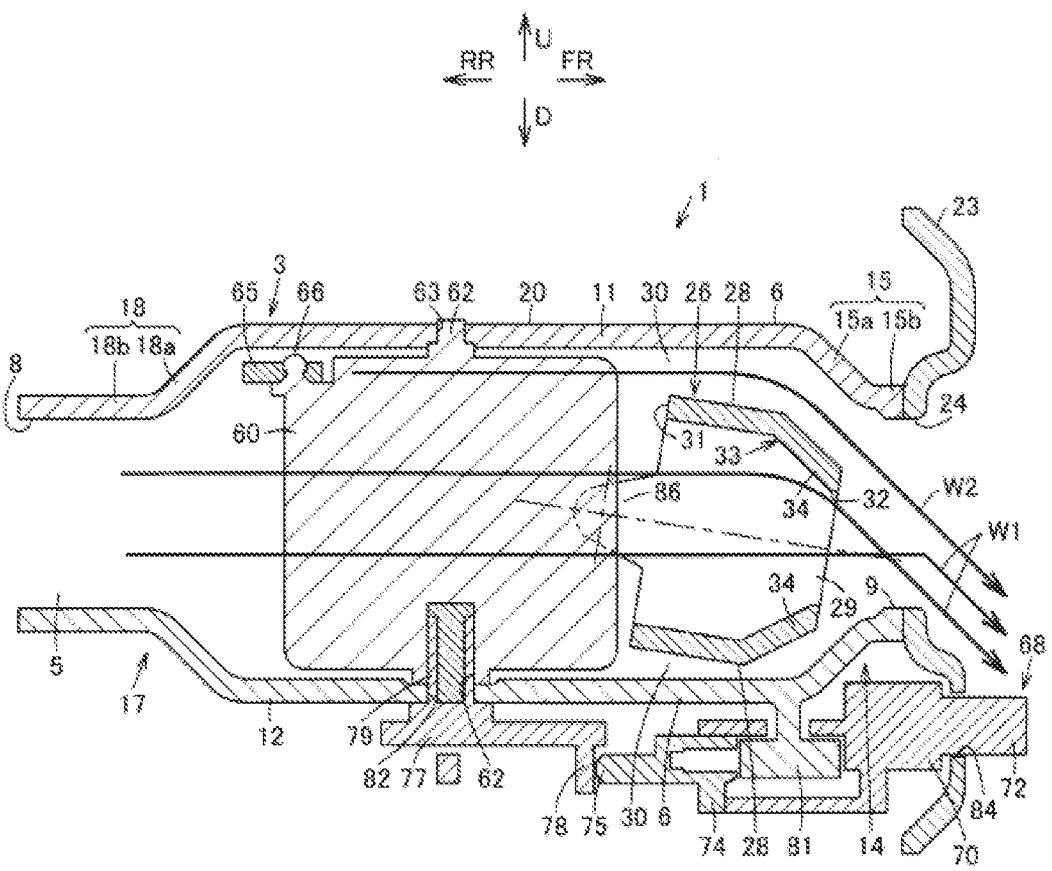
FIG. 8 is a longitudinal sectional view showing a wind distribution state of the wind direction adjustment body of the wind direction adjustment apparatus.

FIG. 8 shows a state where the wind direction adjustment body 26 is swung to the maximum in the downward direction. In this way, when the wind direction adjustment body 26 is swung in the downward direction, in accordance with the movement amount of the wind direction adjustment body 26, the direction of the air-conditioned wind (mainstream W1) blowing out from the deriving port 32 of the wind direction adjustment body 26 is directed in the downward direction. The flow path 30 on the lower side of the wind direction adjustment body 26 is contracted. The flow path 30 on the upper side is expanded. In this manner, a wind volume of the air-conditioned wind blowing in the downward direction from the air outlet 24 along the inclination of the downstream end of the flow path 30 on the upper side increases, and a wind volume of the air-conditioned wind blowing in the upward direction from the air outlet 24 along the inclination of the downstream end of the flow path 30 on the lower side decreases. When the wind direction adjustment body 26 is swung to the maximum in the downward direction, the flow path 30 on the lower side of the wind direction adjustment body 26 is closed or substantially closed. Therefore, with regard to the wind direction of the air-conditioned wind, the air-conditioned wind (mainstream W1) passing through the inside of the wind direction adjustment body 26 is directed in the downward direction, and the air-conditioned wind (sidestream W2) directed in the downward direction from the passage on the upper side is dominant. In this manner, the wind direction is adjusted in the downward direction in accordance with the movement amount of the wind direction adjustment body 26.

In this way, the cylindrical wind direction adjustment body 26 is disposed to be pivotable in the direction along at least the contraction inside the downstream side which is one end side of the case body 3. Accordingly, while improving the appearance, the wind direction can be adjusted by moving the cylindrical wind direction adjustment body 26 with a simple configuration. Therefore, it is possible to achieve the same operational effects as those of the embodiment 1.

In addition, a configuration in which the wind direction adjustment body 26 pivots is adopted. Accordingly, when the wind direction adjustment body 26 is swung, the direction of the air-conditioned wind (mainstream W1) blowing from the deriving port 32 of the wind direction adjustment body 26 is also changed. Therefore, the directionality of the wind direction can be further strengthened. Furthermore, since the pivotable operation section 43 is used, it is not necessary to provide a mechanism for sliding the wind direction adjustment body 26, and the wind direction adjustment body 26 can easily pivot with a simpler configuration. Therefore, the number of components and manufacturing costs can be further reduced.

In the above-described respective embodiments, the wind direction adjustment apparatus 1 adopts a horizontal type, but may adopt a vertical type whose longitudinal direction is set as the upward-downward direction. The above-described embodiments can adopt the same configuration. In this case, the downstream side which is one end side of the case body 3 is contracted at least in the rightward-leftward direction, and the wind direction adjustment body 6 is movable at least in the rightward-leftward direction. In this manner, it is possible to achieve the same operational effects as those of the respective embodiments.

In addition, the wind direction adjustment apparatus 1 is not limited to an apparatus for an automobile, and may be used for any other desired purpose.

INDUSTRIAL APPLICABILITY

For example, the present invention can be suitably used as a wind direction adjustment apparatus for air conditioning of an automobile.

REFERENCE SIGNS LIST

1 Wind direction adjustment apparatus
3 Case body
26 Wind direction adjustment body
43 Operation section
60 Fin

What is claimed is:

1. A wind direction adjustment apparatus comprising:
a case body whose one end side is contracted in a predetermined direction, and through which air passes from the other end side to the one end side; and
a wind direction adjustment body disposed to be movable in at least the predetermined direction inside one end side of the case body, and through which a mainstream airflow passes, wherein
an upper first flow path and a lower second flow path are provided between the case body and the wind direction adjustment body,
by movement of the wind direction adjustment body, an opening of one of the first and second flow paths is enlarged while the other of the first and second flow paths is reduced, whereby a flow direction of the mainstream airflow is changed by a sidestream airflow flowing through the enlarged one of the first and second flow paths; and
a fin disposed to be pivotable in a direction intersecting with a ventilation direction inside the case body and a movement direction of the wind direction adjustment body, on an upstream side in the ventilation direction with respect to the wind direction adjustment body.

2. The wind direction adjustment apparatus according to claim 1,
wherein one end side of the wind direction adjustment body is contracted in at least the same direction as the one end side of the case body.

3. The wind direction adjustment apparatus according to claim 1, further comprising:
an operation section disposed to be movable to an outside of the case body, wherein the wind direction adjustment body is disposed to be movable along a movement direction of the operation section.

4. A wind direction adjustment apparatus comprising:
a case body whose one end side is contracted in a predetermined direction, and through which air passes from the other end side to the one end side;
a wind direction adjustment body disposed to be movable in at least the predetermined direction inside one end side of the case body, and through which a mainstream airflow passes, wherein
an upper first flow path and a lower second flow path are provided between the case body and the wind direction adjustment body,
by movement of the wind direction adjustment body, an opening of one of the first and second flow paths is enlarged while the other of the first and second flow paths is reduced, whereby a flow direction of the mainstream airflow is changed by a sidestream airflow flowing through the enlarged one of the first and second flow paths,
wherein the wind direction adjustment body comprises:
a pair of end walls; and
upper and lower guide portions that are connected to the pair of end walls and are inclined inward with respect to the pair of end walls.

5. The wind direction adjustment apparatus according to claim 1,
wherein, when an opening of the upper first flow path is increased and an opening of the lower second flow path is reduced, air directed downward relative to the mainstream airflow is discharged from the case body,
and when the opening of the upper first flow path is reduced and the opening of the lower second flow path is increased, air directed upward relative to the mainstream airflow is discharged from the case body.

6. The wind direction adjustment apparatus according to claim 1,
wherein the wind direction adjustment body is configured to move in an up-down direction.

7. The wind direction adjustment apparatus according to claim 1,
wherein the wind direction adjustment body comprises a support portion, and
the wind direction adjustment body is configured to rotate with respect to the support portion.

8. A wind direction adjustment apparatus comprising:
a case body whose one end side is contracted in a predetermined direction, and through which air passes from the other end side to the one end side;
a wind direction adjustment body disposed to be movable in at least the predetermined direction inside one end side of the case body, and through which a mainstream airflow passes, wherein
an upper first flow path and a lower second flow path are provided between the case body and the wind direction adjustment body,
by movement of the wind direction adjustment body, an opening of one of the first and second flow paths is enlarged while the other of the first and second flow paths is reduced, whereby a flow direction of the mainstream airflow is changed by a sidestream airflow flowing through the enlarged one of the first and second flow paths, and
wherein a derivation port of the wind direction adjustment body is provided upstream of a blow-out port of the case body.

9. The wind direction adjustment apparatus according to claim 1, wherein a derivation port of the wind direction adjustment body is provided in a positional range corresponding to an inclined portion of the case body.

10. The wind direction adjustment apparatus according to claim 1, wherein a derivation port of the wind direction adjustment body is configured to be entirely located within a projection range, in a ventilation direction, of a blow-out port of the case body over an entire movement range of the wind direction adjustment body.

\* \* \* \* \*